United States Patent [19]

Hayes

[11] Patent Number: 5,033,569
[45] Date of Patent: Jul. 23, 1991

[54] AIRBAG CRASH PROTECTION

[76] Inventor: Steven L. Hayes, Rte. 1, Box 491, Muldrow, Okla. 56133-4672

[21] Appl. No.: 505,575

[22] Filed: Apr. 6, 1990

[51] Int. Cl.$^5$ .................... B60R 21/00; B60R 19/02
[52] U.S. Cl. .................................... 180/169; 293/118
[58] Field of Search ............ 180/167, 169, 271, 274; 293/107, 118, 133

[56] References Cited

U.S. PATENT DOCUMENTS

| | | | |
|---|---|---|---|
| 1,881,390 | 10/1932 | Schmidt | 293/107 |
| 3,355,208 | 11/1967 | Brock | 293/118 |
| 3,656,791 | 4/1972 | Truesdell | 293/107 |
| 3,689,054 | 9/1972 | Gouirand | 293/107 |
| 3,708,194 | 1/1973 | Amit | 293/107 |
| 3,735,398 | 5/1973 | Ross | 180/169 |
| 3,749,197 | 7/1973 | Deutsch | 180/169 |
| 3,862,669 | 1/1975 | Lindbert et al. | 280/734 |
| 3,891,966 | 6/1975 | Sztankay | 180/169 |
| 3,921,749 | 11/1975 | Kawada | 180/169 |
| 3,947,061 | 3/1976 | Ellis | 293/118 |
| 4,407,388 | 10/1983 | Steel | 180/169 |
| 4,437,696 | 3/1984 | Straub | 293/118 |
| 4,474,257 | 10/1984 | Lee | 293/118 |
| 4,518,183 | 5/1985 | Lee | 293/118 |
| 4,833,469 | 5/1989 | David | 180/169 |

Primary Examiner—Richard A. Bertsch

[57] ABSTRACT

An impact-absorption mechanism installable on an automotive vehicle to minimize damage to vehicles involved in street accidents. At the onset of an accident a pressurized gas is introduced into one or more air bags to automatically inflate the bags and move them outwardly from the vehicle body. The inflated bags are impacted by the other vehicle, such that some of the collision force is dissipated without causing damage to the vehicles.

1 Claim, 1 Drawing Sheet

AIRBAG CRASH PROTECTION

BACKGROUND AND SUMMARY OF THE INVENTION

This invention relates to a mechanism for minimizing damage to automotive vehicles during accidents on the highways. The damage-minimizing mechanism comprises a resilient impact-absorption means carried on the front and/or rear end of an automotive vehicle. Normally the impact-absorption mechanism is in a retracted position close to the front or rear end of the vehicle. At the onset of an accident the impact-absorption mechanism is extended away from the vehicle, so as to be in position to receive the blow from the other vehicle and recoil with minimal damage to the vehicle on which the impact-absorption mechanism is carried.

In its preferred form the impact-absorption mechanism comprises one of more air bags carried in a collapsed condition at the front or rear end of a vehicle. Should another vehicle approach the vehicle sufficiently close as to make a collision likely, a pneumatic pressure source on board the vehicle is triggered to discharge pressurized gas into the airbag, causing the bag to inflate and expand from the end of the vehicle into the path of the other vehicle. Impaction forces generated by the other vehicle deflect the bag to decelerate the other vehicle and prevent or minimize damage to the vehicle that carries the airbag.

The principal aim of the invention is to minimize vehicle damage associated with vehicle accidents. However, in some cases the mechanism can reduce the seriousness of injuries to persons riding in the vehicles; the impact-absorption mechanism decelerates the oncoming vehicle in a somewhat gradual fashion, such that the vehicle occupants may experience a lessened shock force as the two vehicles impact together (following deflection of the airbag).

THE DRAWINGS

DESCRIPTION OF A PREFERRED EMBODIMENT OF THE INVENTION

Figure 2:
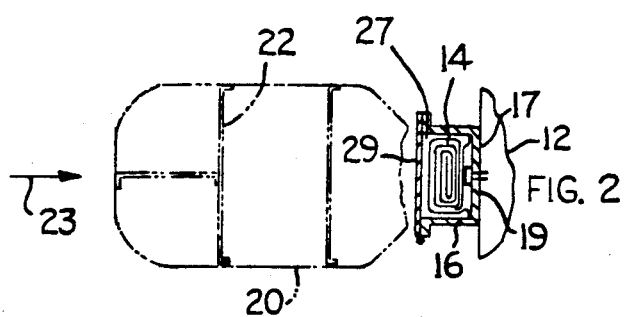
FIG. 2 is a sectional view taken on line 2—2 in FIG. 1.
Figure 1:
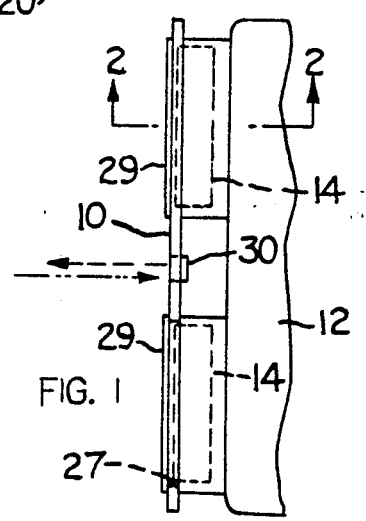
FIG. 1 is a fragmentary top plan view of an automotive vehicle utilizing the present invention.

FIG. 1 illustrates the presently-preferred form of the invention. The invention is incorporated into a generally conventional automotive vehicle between one of the vehicle bumpers 10 and the vehicle body 12. The invention can be used at the front end of the vehicle and/or at the rear end of the vehicle. The invention is a defensive impact-absorption mechanism designed to minimize damage to a vehicle (or injury to vehicle occupants) during a front-end collision or a rear end collision, depending on the location of the mechanism. As shown in FIGS. 1 and 2, the impact-absorption mechanism comprises two air bags 14 normally stored in collapsed (deflated) condition within compartments 16 located between bumper 10 and the vehicle body. These two compartments 16 can serve as a mounting (connection) mechanism for the bumper.

Each airbag is stored in a coiled condition, as shown generally in FIG. 2. One end of each airbag is closed; the other open end of each airbag is sealably connected to the rear wall 17 of the associated compartment 16. A pressure-generator capsule 19 is mounted on wall 17, such that when the capsule is triggered into operation a pressurized gas is directed into the associated airbag. Numeral 20 shows the airbag in an inflated pressurized condition extending away from the vehicle into the path of an oncoming vehicle, not shown.

Internal cords or straps 22 may be trained between the opposed walls of the airbag to restrain against bursting when subjected to an impact force from the other vehicle. Numeral 23 designates generally the expected direction of the impact force.

Figure 4:
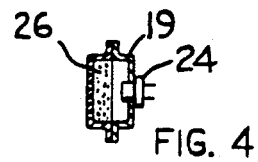
FIG. 4 is a view taken through a pneumatic pressure source used in the FIG. 1 system.
Figure 7:
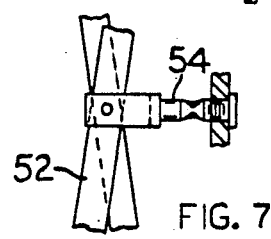
FIG. 7 is an enlarged fragmentary view of a structural detail used in the FIG. 6 structure.

Capsule 19 may be a conventional capsule construction already proposed by others for use with automotive air bags (passenger protection). The general features of such capsules are shown, e.g. in U.S. Pat. Nos. 3,877,882 and 3,985,098 and 4,319,640. FIG. 4 of the present drawings shows a representative capsule 19 as having an electrically-energizable explosive squib 24 for intensely and rapidly heating a mass of mixed reactant particles 26, such that large quantities of nitrogen gas are generated within a few milliseconds.

The gas-generating capsule of FIG. 4 is mounted within a compartment 16 (FIG. 2) so that the generated gas is directed into the coiled airbag, thereby substantially instantaneously inflating the bag to the condition depicted by numeral 20.

Bumper 10 has two elongated openings 27 therethrough communicating with the respective compartments 16. A hinged closure 29 is associated with each opening 27 to normally conceal the stored airbag. At the moment when each airbag is being inflated the bag will generate a force on the associated closure 29 for deflecting the closure away from the associated opening 27. Normally the closure will be maintained in its closed position, either by a releaseable latch or by a spring hinge. The airbag pressure will readily overcome the latch or spring force.

Figure 3:
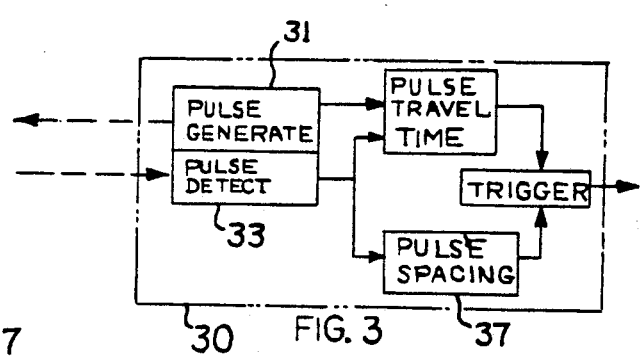
FIG. 3 is a diagrammatic representation of a vehicle sensor that can be used in the FIG. 1 system.

The two air bags are operated (inflated) in unison, just prior to impaction by the other vehicle. In some situations the driver is able to anticipate a crash situation; for such situations a switch button on the steering wheel or floorboard can be used as a triggering device for squibs 24. However, in some cases it would be difficult to anticipate a crash situation. Therefore, in addition to the manual switch it is preferable to have a sensor mechanism available for automatically triggering each explosive squib 24 just prior to the moment of impact. FIG. 3 illustrates diagrammatically a sensor mechanism that might be used.

FIGS. 1 and 3 show a trigger means 30 that includes a pulse generator 31 adapted to send pulses (e.g. laser pulses) away from the vehicle toward an approaching vehicle. These pulses are partially reflected from the approaching vehicle back toward a pulse dectector 33 in trigger means 30. The pulse travel time (both directions) is used to electronically measure the distance between the two vehicles. This technology has been used for several years in military range finders to automatically determine enemy target distances.

FIG. 3 shows the distance measuring sensor means in association with an electronic means 37 for measuring the changes in spacing of the pulses received by detector 33. A predetermined decrease in the pulse spacing time indicates that the other vehicle is approaching at a dangerous rate. When the two parameters (vehicle distance and rate of vehicle approach) indicate the onset of a crash trigger signals are sent to pressure-generating devices 19. It is believed that the sensing-triggering system can be designed to anticipate crash situations while avoiding false alarms, i.e. cases where the air bags are inflated when no crash is imminent.

Figure 6:
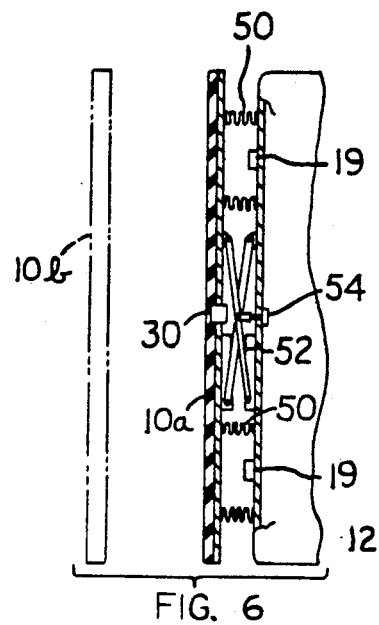
FIG. 6 is a view taken in the same direction as FIG. 5 but showing a further form of the invention.
Figure 5:
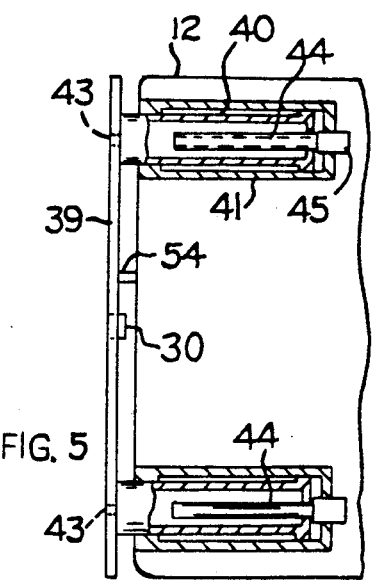
FIG. 5 is a view taken generally in the same direction as FIG. 1, but illustrating another form of the invention.

As noted above, FIGS. 1 and 2 illustrate a preferred form of the invention. FIGS. 5 and 6 illustrate other forms that the invention can take. In FIG. 5 the impact-absorption means comprises two hollow pistons 40 extending rightwardly from vehicle bumper 39 into cylinders 41 that are suitably attached to vehicle body 12. Compressed gas is pre-charged through check value 43 into each piston. An open-ended tube 44 extends through each piston 40 to an electrically-operable (solenoid) valve 45 mounted on the associated cylinder 41.

When trigger means 30 sends the appropriate signal to each valve 45 a flow path is opened from tube 44 to the cylinder space to the right of the associated piston 40. The pistons are thereby driven leftwardly to extend (project) bumper 39 away from the vehicle body. The extended bumper acts as a resilient impact-absorption means in essentially the same fashion as air bags 14 (FIG. 2).

FIG. 6 shows an arrangement that includes two bellows-like air bags 50 trained between the vehicle body and a bumper 10a. A pneumatic pressure-generating capsule 19 is located within each airbag. Bumper 10a can be mounted (attached) to the vehicle body via a lazy tongs mechanism 52 of conventional design. As shown in FIG. 8, a shearable bolt 54 can be trained between the vehicle body and the lazy tongs to prevent inadvertent expansion movement of the lazy tongs.

When trigger means 30 delivers a signal to each capsule 19 the two air bags 50 are substantially instantaneously (within a few miliseconds) expanded to project bumper 10a to a position located away from the vehicle, as shown by dashed lines 10b in FIG. 6. Bolt 54 is sheared (separated) during this process.

The arrangements shown in FIGS. 1, 5 and 6 illustrate various ways in which an impact-absorption means (14 or 39 or 10a) can be moved to an extended position spaced away from the vehicle body just prior to the onset of an impact condition with another vehicle. The extended impact-absorption means is resiliently supported and reinforced so as to absorb a significant percentage of the impact force, thereby minimizing damage to the vehicles and or injury to persons riding in the vehicles.

I claim:

1. In combination, an automotive vehicle having front and rear ends; a transversely-extending bumper at said front end of the vehicle; two compartment means attached to the rear face of said bumper laterally from the bumper midpoint, each compartment means defining a separate compartment; openings in said bumper communicating the space in front of the bumper with respective ones of the compartment; an air bag stored within each compartment in a collapsed deflated condition; a hinged closure means normally closing each said opening to conceal the collapsed air bag within the associated compartment; a sensor means located within said bumper at a central point thereon for sensing the presence of another vehicle moving toward the bumper; a pressurizing gas source connected to each collapsed air bag; and a trigger means operated by said sensor means for activating each said pressurizing source whereby each source delivers pressurized gas into the associated air bag before the other vehicle impacts said bumper; said sensor means comprising a pulse generator adapted to direct time-spaced pulses away from the associated vehicle, and a pulse detector adapted to receive return pulses reflected from moving vehicles in the path of the generated pulses; each said air bag having a collapsed condition with a relatively small volumetric displacement, and an inflated condition extending an appreciable distance beyond the associated bumper; each said hinged closure means being automatically openable as a response to inflation of the associated air bag.

* * * * *